(12) United States Patent
Nunome et al.

(10) Patent No.: US 12,388,580 B2
(45) Date of Patent: *Aug. 12, 2025

(54) BASE STATION, TERMINAL, AND COMMUNICATION METHOD

(71) Applicant: Panasonic Intellectual Property Corporation of America, Torrance, CA (US)

(72) Inventors: Tomoya Nunome, Ishikawa (JP); Takashi Iwai, Ishikawa (JP); Hidetoshi Suzuki, Kanagawa (JP); Ayako Horiuchi, Kanagawa (JP); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,114

(22) Filed: Mar. 26, 2024

(65) Prior Publication Data

US 2024/0243856 A1 Jul. 18, 2024

Related U.S. Application Data

(63) Continuation of application No. 17/420,957, filed as application No. PCT/JP2019/035762 on Sep. 11, 2019, now Pat. No. 11,973,603.

(30) Foreign Application Priority Data

Jan. 9, 2019 (JP) .................................. 2019-001857

(51) Int. Cl.
*H04L 1/1829* (2023.01)
*H04L 5/00* (2006.01)

(52) U.S. Cl.
CPC .......... *H04L 1/1854* (2013.01); *H04L 1/1861* (2013.01); *H04L 5/0055* (2013.01); *H04L 5/0064* (2013.01)

(58) Field of Classification Search
None
See application file for complete search history.

(56) References Cited

U.S. PATENT DOCUMENTS 10,693,584 B2 * 6/2020 Marinier ............... H04L 1/0016
10,863,536 B2 * 12/2020 Liu ....................... H04L 5/0048
(Continued)

FOREIGN PATENT DOCUMENTS

| CN | 106576343 A | 4/2017 |
| WO | WO 2018054191 A1 | 3/2018 |

OTHER PUBLICATIONS

D. Zhang and J. Zhongjun, "Research and development of designing HARQ in LTE system," 2012 2nd International Conference on Consumer Electronics, Communications and Networks (CECNet), Yichang, China, 2012, pp. 2773-2776, (Year: 2012).*

(Continued)

*Primary Examiner* — Daniel F. McMahon
(74) *Attorney, Agent, or Firm* — Seed IP Law Group LLP

(57) ABSTRACT

Provided is a base station that performs feedback with regard to data transmission. The base station includes a downlink feedback information (DFI) generation unit and a transmitter. On the basis of a resource allocation configuration that was configured by a terminal, the DFI generation unit determines a transmission method for feedback information that includes a response signal regarding uplink data. The transmitter transmits the feedback information on the basis of the transmission method.

8 Claims, 10 Drawing Sheets

(56) References Cited

U.S. PATENT DOCUMENTS

| | | |
|---|---|---|
| 2017/0195888 A1* | 7/2017 | Gou ................. H04L 5/005 |
| 2017/0208610 A1* | 7/2017 | Tang .................. H04W 72/12 |
| 2017/0251454 A1 | 8/2017 | Yang et al. |
| 2019/0223203 A1 | 7/2019 | Zhang et al. |
| 2020/0162203 A1* | 5/2020 | Bang .................. H04W 72/23 |
| 2020/0328848 A1* | 10/2020 | He ................. H04L 1/1854 |
| 2021/0084683 A1* | 3/2021 | Li .................. H04W 74/0808 |
| 2021/0289426 A1* | 9/2021 | Bergqvist ............. H04W 48/12 |
| 2021/0345344 A1* | 11/2021 | Sha .................. H04W 24/08 |
| 2021/0400725 A1* | 12/2021 | Harada ................. H04L 5/0005 |

OTHER PUBLICATIONS

3GPP TS 38.211 V15.3.0, "3rd Generation Partnership Project; Technical Specification Group Radio Access Network; NR; Physical channels and modulation (Release 15)," Sep. 2018, 96 pages.

3GPP TS 38.212 V15.3.0, "3rd Generation Partnership Project; Technical Specification Group Radio Access Network; NR; Multiplexing and channel coding (Release 15)," Sep. 2018, 99 pages.

3GPP TS 38.213 V15.3.0, "3rd Generation Partnership Project; Technical Specification Group Radio Access Network; NR; Physical layer procedures for control (Release 15)," Sep. 2018, 101 pages.

3GPP TS 38.214 V15.3.0, "3rd Generation Partnership Project; Technical Specification Group Radio Access Network; NR; Physical layer procedures for data (Release 15)," Sep. 2018, 96 pages.

English Translation of Chinese Search Report dated Dec. 28, 2023, for the corresponding Chinese Patent Application No. 2019800882084, 3 pages.

Extended European Search Report, dated Feb. 21, 2022, for European Application No. 19908460.9-1205, 7 pages.

Huawei, HiSilicon, "Enhanced UL configured grant transmissions," R1-1812226, Agenda Item: 7.2.6.3, 3GPP TSG RAN WG1 Meeting #95, Spokane, USA, Nov. 12-16, 2018, 10 pages.

International Search Report, mailed Nov. 12, 2019, for corresponding International Application No. PCT/JP2019/035762, 2 pages.

OPPO, "Considerations on configured grant for NR-U," R1-1810961, Agenda Item: 7.2.2.4.4, 3GPP TSG RAN WG1 Meeting #94bis, Chengdu, China, Oct. 8-12, 2018, 4 pages.

OPPO, "Considerations on configured grant for NR-U," R1-1812804, Agenda Item: 7.2.2.4.4, 3GPP TSG RAN WG1 Meeting #95, Spokane, USA, Nov. 12-16, 2018, 3 pages.

* cited by examiner

| Index | Starting position in PDCCH | RNTI |
|---|---|---|
| 0 | 0 | 0x1000 |
| 1 | 10 | 0x1000 |
| 2 | 10 | 0x1001 |
| 3 | 20 | 0x1001 |

FIG. 12

| Index | Starting position in PDCCH |
|---|---|
| 0 | 0 |
| 1 | 10 |
| 2 | 10 |
| 3 | 20 |

| Index | RNTI |
|---|---|
| 0 | 0 |
| 1 | 10 |

FIG. 13

BASE STATION, TERMINAL, AND COMMUNICATION METHOD

BACKGROUND

Technical Field

The present disclosure relates to a base station, a terminal, and a communication method.

Description of the Related Art

In 3rd Generation Partnership Project (3GPP), the specification for Release 15 New Radio access technology (NR) has been completed for realization of 5th Generation mobile communication systems (5G). NR supports functions for realizing Ultra Reliable and Low Latency Communication (URLLC) in conjunction with high speed and high capacity that are basic requirements for enhanced Mobile Broadband (eMBB) (see, e.g., Non-Patent Literatures (hereinafter referred to as "NPLs") 1 to 4).

CITATION LIST

Non-Patent Literature

NPL 1
  3GPP TS 38.211 V15.3.0, "NR; Physical channels and modulation (Release 15)," September 2018
NPL 2
  3GPP TS 38.212 V15.3.0, "NR; Multiplexing and channel coding (Release 15)," September 2018
NPL 3
  3GPP TS 38.213 V15.3.0, "NR; Physical layer procedure for control (Release 15)," September 2018
NPL 4
  3GPP TS 38.214 V15.3.0, "NR; Physical layer procedures for data (Release 15)," September 2018

BRIEF SUMMARY

In NR, a feedback method for uplink data transmission has not been examined comprehensively.

One non-limiting and exemplary embodiment facilitates providing a base station, a terminal, and a communication method capable of appropriately performing feedback for uplink data transmission.

A base station according to an exemplary embodiment of the present disclosure includes: control circuitry, which, in operation, determines a transmission method for transmitting feedback information including a response signal for uplink data, based on a configuration of resource allocation configured for a terminal; and transmission circuitry, which, in operation, transmits the feedback information based on the transmission method.

Note that these generic or specific aspects may be achieved by a system, an apparatus, a method, an integrated circuit, a computer program, or a recoding medium, and also by any combination of the system, the apparatus, the method, the integrated circuit, the computer program, and the recoding medium.

According to an exemplary embodiment of the present disclosure, it is possible to perform feedback for uplink data transmission appropriately.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 12 illustrates an example of DFI allocation according to Embodiment 2;
and
FIG. 13 illustrates an example of DFI allocation according to Embodiment 2.

DETAILED DESCRIPTION

Figure 1:
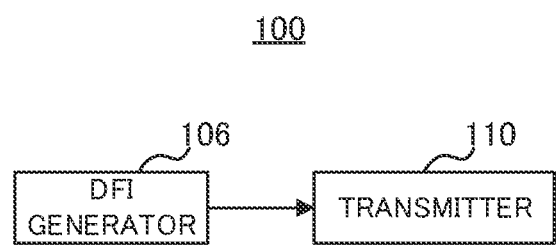
FIG. 1 is a block diagram illustrating an exemplary configuration of a part of a base station.

Hereinafter, embodiments of the present disclosure will be described in detail with reference to the accompanying drawings.

Configured Grant Transmission

Release 15 NR supports "Configured grant transmission" (which is alternatively referred to as "Grant-free transmission") for transmission of uplink data (e.g., Physical Uplink hared Channel (PUSCH)), as one of the functions for URLLC.

The Configured grant transmission for the uplink data in Release 15 NR includes "Configured grant type 1 transmission" (which may also be referred to simply as "Configured grant type 1" in the following) and "Configured grant type 2 transmission" (which may also be referred to simply as "Configured grant type 2" in the following).

In Configured grant type 1, for example, Configured grant configuration information such as a Modulation and Coding Scheme (MCS), radio resource allocation information (e.g., allocation of time resources or frequency resources), transmission timing, and the number of HARQ processes is configured by a terminal-specific higher layer signal (e.g., Radio Resource Control (RRC)). When uplink data is generated, a terminal (User Equipment (UE)) transmits a PUSCH using a pre-configured Configured grant configuration information such as an MCS, radio resource, and the like without a UL grant (in other words, dynamic scheduling information for uplink data) via a downlink control channel (e.g., Physical Downlink Control Channel (PDCCH)) from a base station (for example, also called gNB).

In Configured grant type 2, the Configured grant transmission is activated or released by a PDCCH (e.g., Downlink Control Information (DCI)) from the base station. In Configured grant type 2, the transmission timing, the number of HARQ processes, and the like are configured by the terminal-specific higher layer signal as in Configured grant type 1. On the other hand, in Configured grant type 2, the MCS, radio resource allocation information, and the like are configured by "Activation DCI." When uplink data is generated, the terminal transmits a PUSCH while semi-permanently using the Configured grant configuration information such as the MCS, radio resource, and the like configured by the higher layer signal and the Activation DCI (in other words, without a UL grant).

It is considered that Release 16 NR also supports "Configured grant type 1" and "Configured grant type 2" as in Release 15 NR. In addition, functional enhancements to the Configured grant transmission in Release 16 NR have been discussed.

For example, in Release 15 NR, one terminal can be configured with one active Configured grant transmission. In contrast, in Release 16 NR, it has been considered that one terminal is configured with a plurality of active Configured grant transmissions. For example, it has been considered that one terminal supports a plurality of Configured grant transmissions for each of Configured grant type 1 and Configured grant Type 2, or supports a plurality of Configured grant transmissions of Configured grant type 1 and Configured grant Type 2.

Retransmission Control for Configured Grant Transmission

In Release 15 NR, a UL grant is used for retransmission control for Configured grant transmission. For example, the base station controls the MCS and radio resource allocation information for retransmission uplink data using the UL grant.

In Release 16 NR, as the retransmission control for Configured grant transmission, retransmission control without a UL grant in which explicit hybrid automatic repeat request (HARQ-ACK) information for a PUSCH is fed back has been considered in addition to the retransmission control with the UL grant that is the same as in Release 15 NR. For example, in Release 16 NR, for the retransmission control for Configured grant transmission, it has been considered that a base station transmits feedback information (e.g., Downlink Feedback Information (DFI)) including an explicit response signal (e.g., HARQ-ACK information (ACK or NACK)) for a PUSCH.

For example, in an unlicensed band (e.g., also referred to as "NR-Unlicensed (NR-U)"), HARQ-ACK information for a plurality of pieces of uplink data (e.g., PUSCHs) is fed back to a terminal collectively. This makes it possible, for example, to reduce a load on Listen before talk (LBT) of the base station, to enhance efficiency of the retransmission control. Note that, in the retransmission control by the explicit HARQ-ACK information, the MCS and the radio resource allocation of the retransmission uplink data may for example, be the same as those at the time of initial transmission.

However, in NR, there is scope for further study on a transmission method for transmitting the DFI including the explicit HARQ-ACK information.

In this respect, a description will be given of an exemplary embodiment of the present disclosure in relation to the transmission method for transmitting the DFI including the explicit HARQ-ACK information. For example, an exemplary embodiment of the present disclosure will be described in relation to an efficient transmission method for transmitting the DFI including HARQ-ACK information in a case where a plurality of Configured grant transmissions are configured for one terminal.

Overview of Communication System

A communication system according to an aspect of the present disclosure includes base station 100 (e.g., gNB) and terminal 200 (e.g., UE).

FIG. 1 is a block diagram illustrating a configuration example of a part of base station 100 according to an aspect of the present disclosure. In base station 100 illustrated in FIG. 1, DFI generator 106 (corresponding to the control circuitry) determines a transmission method for transmitting feedback information (e.g., DFI) including a response signal (e.g., HARQ-ACK information) for uplink data based on a configuration (e.g., Configured grant type or the like) of resource allocation (e.g., Configured grant) configured for terminal 200. Transmitter 110 (corresponding to the transmission circuitry) transmits the feedback information based on the transmission method.

Figure 2:
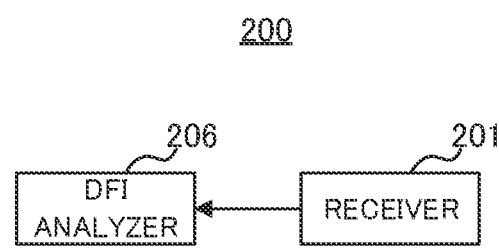
FIG. 2 is a block diagram illustrating an exemplary configuration of a part of a terminal.

FIG. 2 is a block diagram illustrating a configuration example of a part of terminal 200 according to an aspect of the present disclosure. In terminal 200 illustrated in FIG. 2, receiver 201 (corresponding to the reception circuitry) receives, from base station 100, the feedback information (e.g., DFI) including the response signal (e.g., HARQ-ACK information) for the uplink data. DFI analyzer 206 (corresponding to the control circuitry) analyzes the feedback information (e.g., DFI) based on the configuration of the resource allocation (e.g., Configured grant) configured for terminal 200.

Configuration of Base Station

Figure 3:
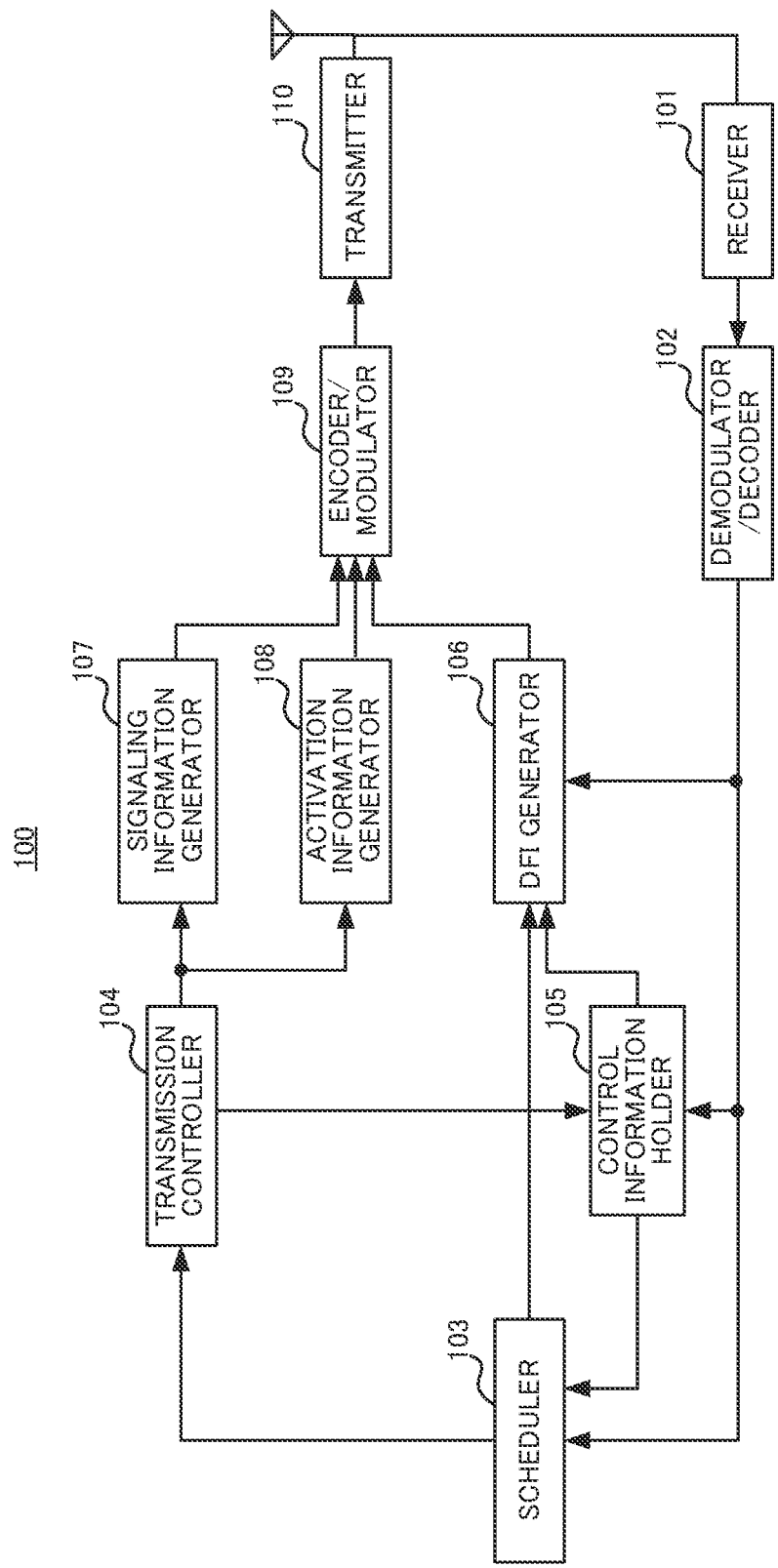
FIG. 3 is a block diagram illustrating an exemplary configuration of the base station.

FIG. 3 is a block diagram illustrating a configuration example of base station 100 according to an aspect of the present disclosure. In FIG. 3, base station 100 includes receiver 101, demodulator/decoder 102, scheduler 103, transmission controller 104, control information holder 105, DFI generator 106, signaling information generator 107, activation information generator 108, encoder/modulator 109, and transmitter 110.

Receiver 101 receives, via an antenna, a signal transmitted by terminal 200, performs reception processing such as down-conversion, A/D conversion, or the like on the reception signal, and outputs the reception signal after the reception processing to demodulator/decoder 102.

Demodulator/decoder 102 performs demodulation and decoding on the reception signal (e.g., uplink data) inputted from receiver 101, and outputs control information included in the decoded signal to control information holder 105. Demodulator/decoder 102 also outputs a decoding result of the uplink data to scheduler 103 and DFI generator 106.

The decoding result of the uplink data may include, for example, information indicating success or failure of decoding for each Transport Block (TB). In addition, when transmission on a basis of a Code Block Group (CBG) is enabled, the decoding result of the uplink data may further include information indicating success or failure of decoding for each CBG.

Further, the control information outputted to control information holder 105 may include, for example, the data type and the data amount of the data held by terminal 200 in a buffer.

Scheduler 103 performs scheduling for Configured grant transmission (e.g., determines the start and end of Configured grant transmission) based on, for example, the control information inputted from control information holder 105. Scheduler 103 outputs scheduling information indicating a scheduling result to transmission controller 104.

Further, scheduler 103 controls retransmission of the uplink data based on the decoding result of the uplink data inputted from demodulator/decoder 102. For example, scheduler 103 instructs DFI generator 106 to perform DFI generation (or DFI transmission) when retransmission control based on explicit HARQ-ACK information is performed on the uplink data.

Transmission controller 104 configures parameters relevant to the Configured grant transmission (e.g., an MCS, radio resource allocation information, and the like) based on the scheduling information inputted from scheduler 103. Transmission controller 104 generates information indicating the configuration related to the Configured grant transmission (e.g., Configured grant configuration information). For example, in the case of Configured grant type 1, transmission controller 104 outputs the Configured grant configuration information to signaling information generator 107. For example, in the case of Configured grant type 2, transmission controller 104 outputs the Configured grant configuration information to signaling information generator 107 and activation information generator 108. Further, transmission controller 104 outputs the Configured grant configuration information to control information holder 105.

Control information holder 105 holds, for example, the control information from terminal 200 that is inputted from demodulator/decoder 102 and the Configured grant configuration information inputted from transmission controller 104, and outputs the held information to scheduler 103 or DFI generator 106 as necessary.

DFI generator 106 generates DFI (e.g., a payload of the DFI) based on the decoding result of the uplink data inputted from demodulator/decoder 102 and the Configured grant configuration information inputted from control information holder 105 in accordance with an instruction from scheduler 103. DFI generator 106 outputs the generated DFI to encoder/modulator 109. For example, the DFI may be composed of information for one terminal 200 (e.g., generated for a UE specific PDCCH) or may be composed of information for a plurality of terminals 200 (e.g., generated for a Group common PDCCH (GC-PDCCH).

Signaling information generator 107 generates higher-layer signaling information (which is alternatively referred to as RRC signaling, higher layer parameter, or the like) used for configuration of Configured grant type 1 or Configured grant type 2 based on the Configured grant configuration information inputted from transmission controller 104, and outputs the generated signaling information to encoder/modulator 109.

Based on the Configured grant configuration information inputted from transmission controller 104, activation information generator 108 generates Activation information (e.g., information on Activation or Release; in other words, Activation DCI) used for configuration of Configured grant type 2, and outputs the Activation information to encoder/modulator 109.

Encoder/modulator 109 encodes and modulates the DFI inputted from DFI generator 106, the signaling information inputted from signaling information generator 107, or the Activation information inputted from activation information generator 108, and outputs the modulated signal (symbol sequence) to transmitter 110.

Transmitter 110 performs transmission processing such as D/A conversion, up-conversion, amplification, or the like on the signal inputted from encoder/modulator 109, and transmits, from the antenna to terminal 200, a radio signal obtained by the transmission processing.

Configuration of Terminal

Figure 4:
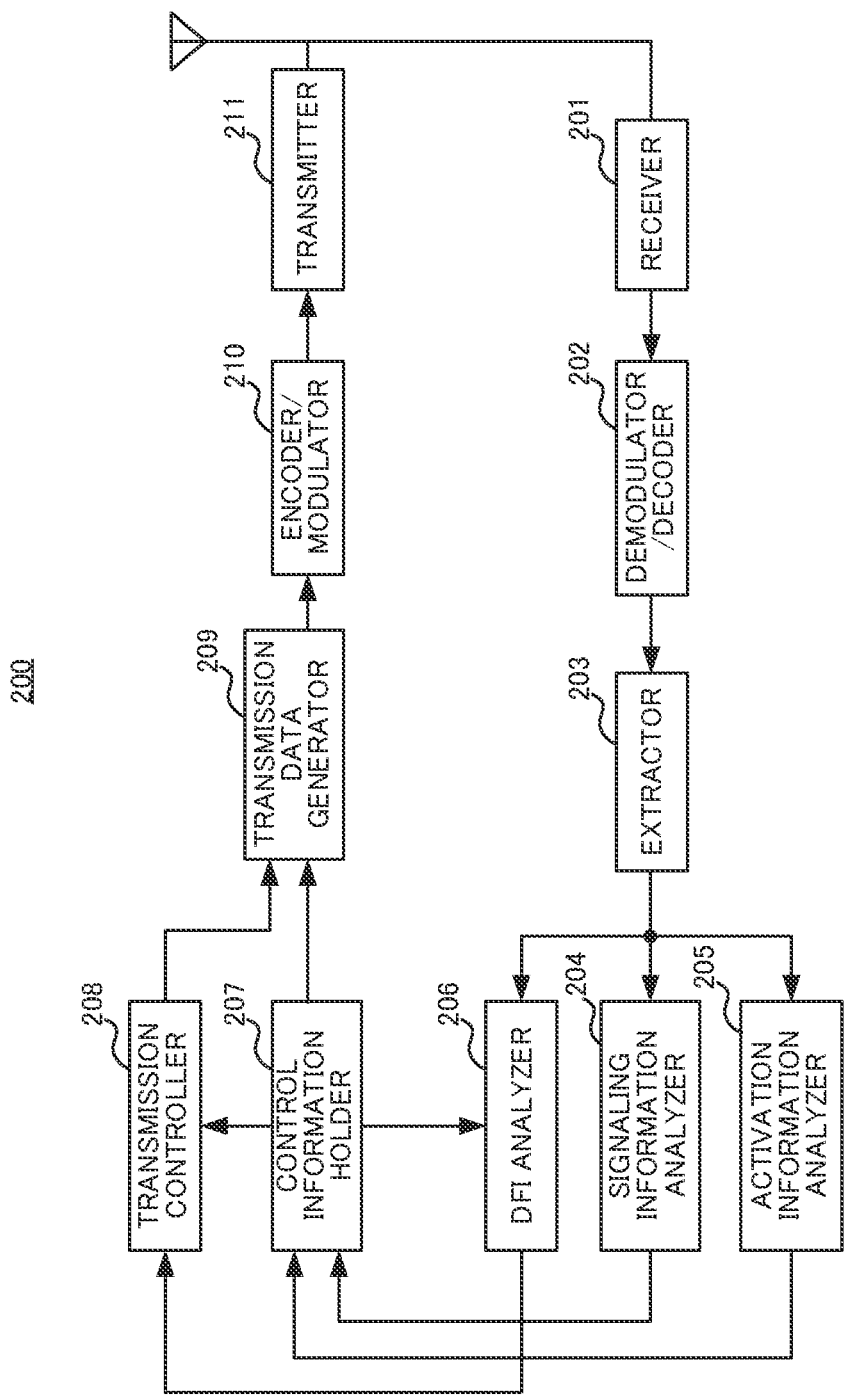
FIG. 4 is a block diagram illustrating an exemplary configuration of the terminal.

FIG. 4 is a block diagram illustrating a configuration example of terminal 200 according to an aspect of the present disclosure. In FIG. 4, terminal 200 includes receiver 201, demodulator/decoder 202, extractor 203, signaling information analyzer 204, Activation information analyzer 205, DFI analyzer 206, control information holder 207, transmission controller 208, transmission data generator 209, encoder/modulator 210, and transmitter 211.

Receiver 201 performs reception processing such as down-conversion, A/D conversion, or the like on a reception signal received via an antenna, and outputs the reception signal to demodulator/decoder 202.

Demodulator/decoder 202 demodulates and decodes the reception signal inputted from receiver 201. Demodulator/decoder 202 outputs the decoded signal to extractor 203.

Extractor 203 extracts, for example, signaling information, Activation information, or DFI from the signal inputted from demodulator/decoder 202. Extractor 203 outputs the signaling information to signaling information analyzer 204, outputs the Activation information to Activation information analyzer 205, and outputs the DFI to DFI analyzer 206.

Signaling information analyzer 204 analyzes the signaling information inputted from extractor 203, and outputs Configured grant configuration information for Configured grant type 1 or Configured grant type 2 to control information holder 207.

Activation information analyzer 205 analyzes the Activation information inputted from extractor 203, and outputs the Activation information (for example, Configured grant configuration information for Configured grant type 2) to control information holder 207.

Based on the Configured grant configuration information inputted from control information holder 207, DFI analyzer 206 analyzes the DFI inputted from extractor 203, and outputs the obtained HARQ-ACK information to transmission controller 208.

Control information holder 207 holds the Configured grant configuration information inputted from signaling information analyzer 204 or Activation information analyzer 205, and outputs the held Configured grant configuration information to DFI analyzer 206, transmission controller 208, or transmission data generator 209 as necessary.

Based on the Configured grant configuration information inputted from control information holder 207 and the HARQ-ACK information inputted from DFI analyzer 206, transmission controller 208 judges whether or not to perform Configured grant transmission. When the Configured grant transmission is performed, transmission controller 208 instructs transmission data generator 209 to perform the Configured grant transmission.

In accordance with the instruction of transmission controller 208, transmission data generator 209 generates transmission data (e.g., PUSCH) based on the Configured grant configuration information inputted from control information holder 207, and outputs the transmission data (e.g., PUSCH) to encoder/modulator 210. For example, the transmission data may include control information for terminal 200 (the data type, the data amount, or the like of data held in the buffer of terminal 200).

Encoder/modulator 210 encodes and modulates the transmission data inputted from transmission data generator 209, and outputs the modulated signal to transmitter 211.

Transmitter 211 performs transmission processing such as D/A conversion, up-conversion, amplification, or the like on the signal inputted from encoder/modulator 210, and transmits, from the antenna to base station 100, a radio signal obtained by the transmission processing.

Operation of Base Station 100 and Terminal 200

An operation example in base station 100 and terminal 200 having the above configurations will be described.

Figure 5:
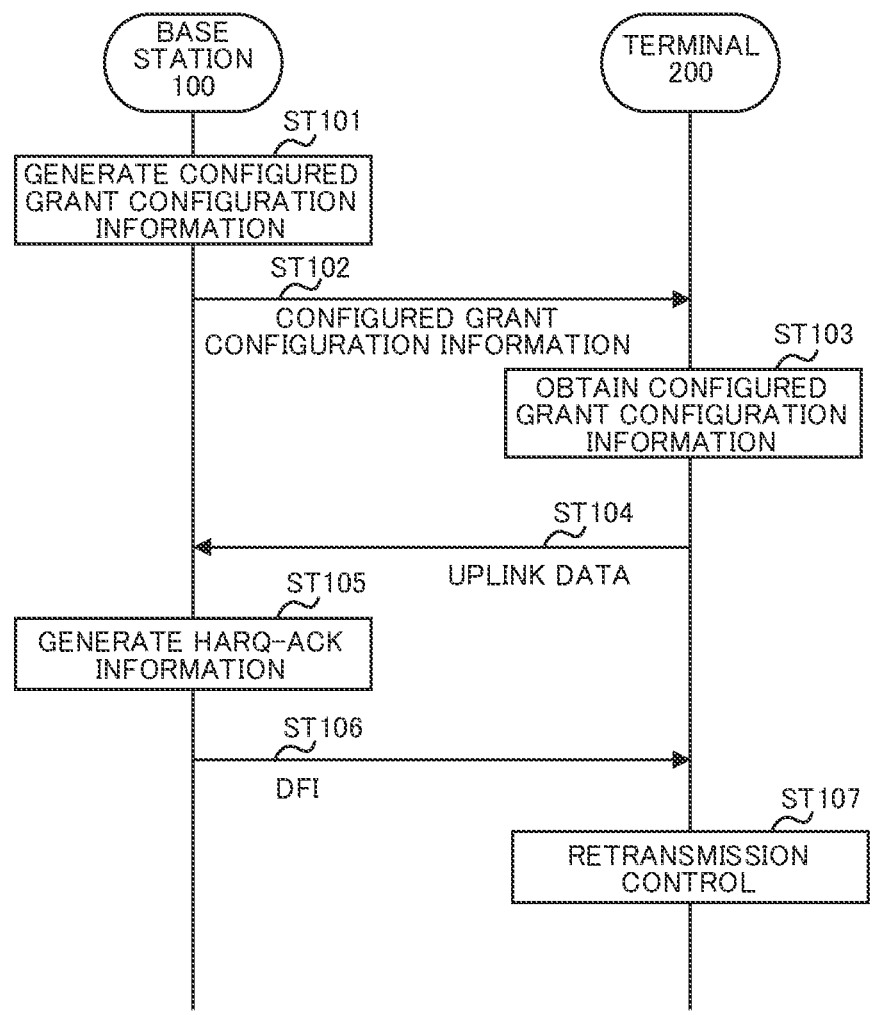
FIG. 5 is a sequence diagram illustrating an operation example of the base station and the terminal.

FIG. 5 is a sequence diagram illustrating an operation of base station 100 and terminal 200.

For example, base station 100 generates Configured grant configuration information based on scheduling information for terminal 200 (ST101). Base station 100 notifies terminal 200 of the Configured grant configuration information (ST102). The Configured grant configuration information (e.g., including signaling information or Activation information) is notified to terminal 200 by a higher layer signal and Activation DCI, for example, according to a Configured grant type. Terminal 200 obtains the Configured grant configuration information notified from base station 100 (ST103).

For example, when uplink data is generated, terminal 200 transmits the uplink data based on the Configured grant configuration information (ST104).

Base station 100 generates HARQ-ACK information (e.g., ACK or NACK) for the uplink data (ST105), and transmits (in other words, feeds back) DFI including the generated HARQ-ACK information to terminal 200 (ST106). Note that, base station 100 determines a transmission method for transmitting the DFI (in other words, HARQ-ACK information) based on Configured grant configuration (e.g., Configured grant type or the like) for terminal 200.

Terminal 200 performs retransmission control for the uplink data based on the HARQ-ACK information included in the received DFI (ST107).

TB Size and Number of CBGs

As described above, in NR, retransmission control per CBG are defined for uplink data (e.g., PUSCH).

The CBG is composed of a group of one or more Code Blocks (CBs), and a transport block (TB) is composed of one or more CBGs. The maximum number of CBGs per TB is configured, for example, by base station 100 for terminal 200 by the higher layer signaling. In terminal 200, CBs are formed into a group such that the number of groups should not exceed the configured maximum number of CBGs. By feeding back HARQ-ACK information for uplink data for each CBG of the uplink data, base station 100 allows retransmission by terminal 200 per CBG.

Further, a calculation method for calculating the number of CBs used for encoding a PUSCH in NR is defined in, for example, NPL 2. For example, NPL 2 discloses a calculation method for calculating the number of CBs in Low density Parity Check (LDPC) coding.

According to NPL 2, when the number of CBs is less than the maximum number of CBGs, the number of CBGs used may be less than the maximum number of CBGs. For example, when the TB size is 5,000 bits and LDPC base graph 2 is used in the LDPC coding (e.g., maximum CB size=3,840 bits), the number of CBs per TB is 2. At this time, for example, even when the maximum number of CBGs is configured to 4, the number of CBGs used by terminal 200 is configured to 2 since the number of existing CBs is 2.

As is understood, the number of CBGs used by terminal 200 varies according to the TB size in the PUSCH. Accordingly, in the case of retransmission control for each CBG, the size of HARQ-ACK information for the PUSCH (e.g., the number of bits) varies according to the TB size in the PUSCH.

In addition, in Configured grant transmission, the variation in the TB size in the PUSCH (in other words, the configuration occasion) differs depending on, for example, the Configured grant type (e.g., Configured grant type 1 or Configured grant type 2). For example, the TB size is configured semi-statically in Configured grant type 1, whereas it is configured dynamically in Configured grant type 2.

Taking this into consideration, in the present embodiment, base station 100 (e.g., DFI generator 106) calculates the size (e.g., the number of bits) of HARQ-ACK information included in DFI depending on the Configured grant type.

DFI Information Generation Method

Hereinafter, an exemplary method for DFI generator 106 of base station 100 to generate HARQ-ACK information included in DFI will be described.

The DFI (e.g., DFI bit sequence) includes, for example, a HARQ-ACK bit sequence, and a bit sequence of other control information (e.g., TPC command, precoding information, or the like).

Figure 6:
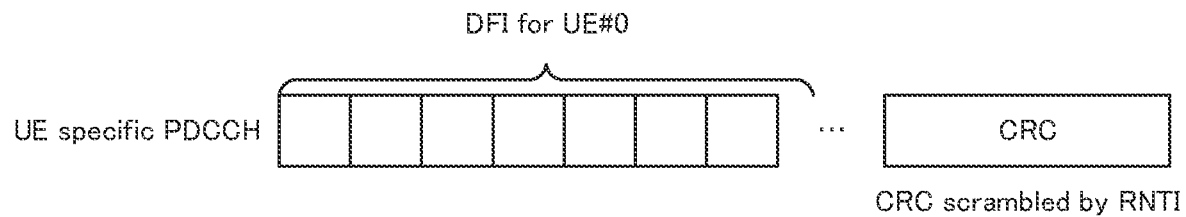
FIG. 6 illustrates an example of DFI according to Embodiment 1.

When base station 100 transmits the DFI using a control channel for specific terminal 200 (e.g., UE specific PDCCH), base station 100 transmits a DFI bit sequence for one terminal 200 (e.g., UE #0) using the PDCCH, for example, as illustrated in FIG. 6.

Figure 7:
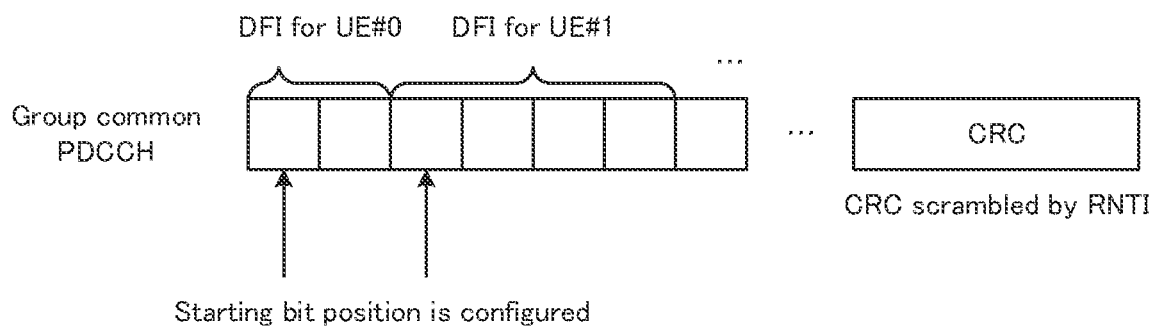
FIG. 7 illustrates an example of DFI according to Embodiment 1.

On the other hand, when base station 100 transmits the DFI using a control channel for a plurality of terminals 200 (e.g., GC-PDCCH), base station 100 transmits, using the PDCCH, a bit sequence in which respective DFI bit sequences for the plurality of terminals 200 (e.g., UE #0 and UE #1) are arranged, for example, as illustrated in FIG. 7. In the GC-PDCCH, for example, the starting positions (starting bit positions) at which the DFI bit sequences addressed to respective terminals 200 are arranged and the sizes (e.g., the numbers of bits) of the DFI are notified to terminals 200 in advance by Configured grant configuration information, or are determined by terminals 200 based on the notified information.

Further, the HARQ-ACK bit sequence may be, for example, in a bitmap format in which HARQ-ACK bits for each HARQ process that are used for Configured grant transmission are arranged in order.

Here, when the retransmission control per CBG is not enabled (for example, when HARQ-ACK per TB is transmitted), base station 100 generates a HARQ-ACK bit sequence in which the number of HARQ-ACK bits per one HARQ process (for example, one TB) is one bit. For example, when two processes are used for Configured grant type 1, when four processes are used for Configured grant type 2, and when these HARQ processes differ from one another, base station 100 generates a HARQ-ACK bit sequence of 6 bits.

On the other hand, when the retransmission control per CBG is enabled (for example, when HARQ-ACK per CBG is transmitted), base station 100 calculates the number of HARQ-ACK bits per TB as follows based on the "Configured grant type" configured for terminal 200.

For example, when the Configured grant type is Configured grant type 1, base station 100 calculates the number of HARQ-ACK bits per TB based on the TB size of the PUSCH. For example, base station 100 configures the number of HARQ-ACK bits per TB to the same value as the number of CBGs determined based on the number of CBs calculated from the TB size. For example, when the maximum number of CBGs is 4 and when the number of CBs determined from the TB size is 2, the number of CBGs used by terminal 200 is configured to 2. Thus, base station 100 configures the number of HARQ-ACK bits per TB to 2 bits that is the same number as the number of CBGs (in other words, the number of CBs).

In Configured grant type 1, the MCS and frequency resource allocation are semi-statically determined by the higher layer signaling. This means that in Configured grant type 1, the TB size is configured semi-statically. Accordingly, in Configured grant type 1, the number of CBGs actually used by terminal 200 is also configured semi-statically. Thus, in Configured grant type 1, when the number of CBs is less than the maximum number of CBGs, the number of HARQ-ACK bits equal to the number of CBs only needs to be secured instead of securing the number of HARQ-ACK bits equal to the maximum number of CBGs.

On the other hand, when the Configured grant type is Configured grant type 2, base station 100 calculates the number of HARQ-ACK bits per TB based on the maximum number of CBGs to be configured. For example, base station 100 configures the number of HARQ-ACK bits per TB to the same value as the maximum number of CBGs. For example, when the maximum number of CBGs is 4, base station 100 configures the number of HARQ-ACK bits per TB to 4 bits that is the same number as the maximum number of CBGs.

In Configured grant type 2, the MCS and frequency resource allocation may be dynamically changed by Activation or Reactivation by the PDCCH. This means that in Configured grant type 2, the TB size can change dynamically. Accordingly, in Configured grant type 2, the number of CBGs actually used by terminal 200 may also change dynamically, and the number of HARQ-ACK bits corresponding to the number of CBGs may also change dynamically. Thus, in Configured grant type 2, HARQ-ACK bits equal in number to the maximum number of CBGs are secured.

Note that, when a HARQ process is shared between Configured grant type 1 and Configured grant type 2, base station 100 may configure the number of HARQ-ACK bits per TB to the same value as the maximum number of CBGs. This is because it is probable that in Configured grant type 2, HARQ-ACK equal in number to the maximum number of CBGs is transmitted, and it is thus necessary to secure HARQ-ACK bits equal in number to the maximum number of CBGs.

In addition, DFI analyzer 206 of terminal 200 analyzes the DFI based on the same method as the aforementioned DFI generation method for base station 100 to generate the DFI including HARQ-ACK information described above.

As described above, in the present embodiment, base station 100 determines the transmission method for transmitting the DFI including HARQ-ACK information for the uplink data based on the configuration (for example, Configured grant type) of resource allocation (for example, Configured grant) configured for terminal 200, and transmits the DFI based on the determined transmission method.

Further, terminal 200 receives the DFI from base station 100, and analyzes the DFI based on the Configured grant configuration for terminal 200.

For example, according to a Configured grant type and HARQ process assignment, base station 100 and terminal 200 determine the number of bits to be used for transmission of HARQ-ACK information per TB. Thus, the number of bits used for transmission of HARQ-ACK information is configured appropriately according to the Configured grant type. According to the present embodiment, it is possible, for example, to reduce the number of HARQ-ACK bits used as compared with the case where number of HARQ-ACK bits equal to the maximum number of CBGs is constantly secured.

Accordingly, according to the present embodiment, base station 100 is capable of performing appropriate feedback for the transmission of uplink data by terminal 200.

Note that, the present embodiment is also applicable to a case where the number of HARQ-ACK bits per one TB is configured independently of the maximum number of CBGs. For example, when the number of HARQ-ACK bits per TB in Configured grant type 2 is configured to the normal number of bits and the number of HARQ-ACK bits per TB in Configured grant type 1 is configured to the number of bits calculated from the TB size, the present embodiment is also applicable to a case where the number of HARQ-ACK bits per TB in Configured grant type 2 is greater than the number of HARQ-ACK bits per TB in Configured grant type 1, or a case where the number of HARQ-ACK bits per TB in Configured grant type 2 is greater than or equal to the number of HARQ-ACK bits per TB of Configured grant type 1.

In addition, in the present embodiment, the number of HARQ-ACK bits per TB in Configured grant type 2 is not limited to the maximum number of CBGs, and may be selected from a plurality of candidate values (e.g., 2, 4, 6, and 8).

Embodiment 2

In Configured grant type 2, a terminal does not transmit a PUSCH when Configured grant transmission is not enabled by Activation notification by a PDCCH. When the terminal does not transmit a PUSCH, HARQ-ACK information is not required. However, when resources are semi-statically allocated by the higher layer signaling or the like, it is supposed that resources for HARQ-ACK information (e.g., bits) are left secured even when the HARQ-ACK information is not required.

Figure 8:
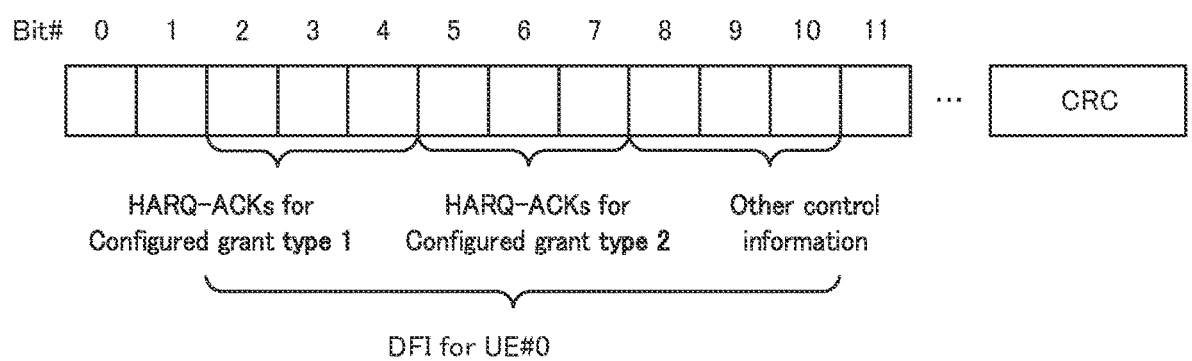
FIG. 8 illustrates an exemplary PDCCH.

By way of example, as illustrated in FIG. 8, the allocation of DFI bits in which 3 HARQ-ACK bits are secured for each of Configured grant type 1 and Configured grant type 2 will be described. In FIG. 8, when Configured grant type 2 is not Activated, 3 bits corresponding to HARQ-ACK information for Configured grant type 2 are not used but are secured.

As is understood, when Configured grant type 2 is configured for a terminal, resources that are secured for HARQ-ACK information but are not used may occur.

Further, the resources that are secured but are not used are not limited to resources in the case where Configured grant types 1 and 2 are mixed as illustrated in FIG. 8. For example, the same happens when Configured grant type 1 is not configured and Configured grant type 2 is configured (e.g., one or more Configured grant types 2 are configured by the higher layer signaling) (not illustrated).

In this respect, the present embodiment will be described in relation to a method for reducing ineffective resources that are not used for the above-described HARQ-ACK information.

Since the base station and the terminal according to the present embodiment have the same basic configurations as base station 100 and terminal 200 according to Embodiment 1, they will be described with reference to FIGS. 3 and 4.

For example, control regarding DFI transmission in base station 100 (e.g., DFI generator 106) and terminal 200 (e.g., DFI analyzer 206) will be described. Hereinafter, division method 1 and division method 2 for DFI will be described.

Division Method 1

In division method 1, base station 100 divides DFI by using different identifiers (e.g., Radio Network Temporary Identifiers (RNTIs)) depending on a Configured grant type and configuration (Configured grant configuration) relevant to Configured grant transmission.

When determining the Configured grant configuration, base station 100 configures an RNTI and a DFI-bit allocation starting position in a PDCCH that are different for each Configured grant configuration.

Figure 9:
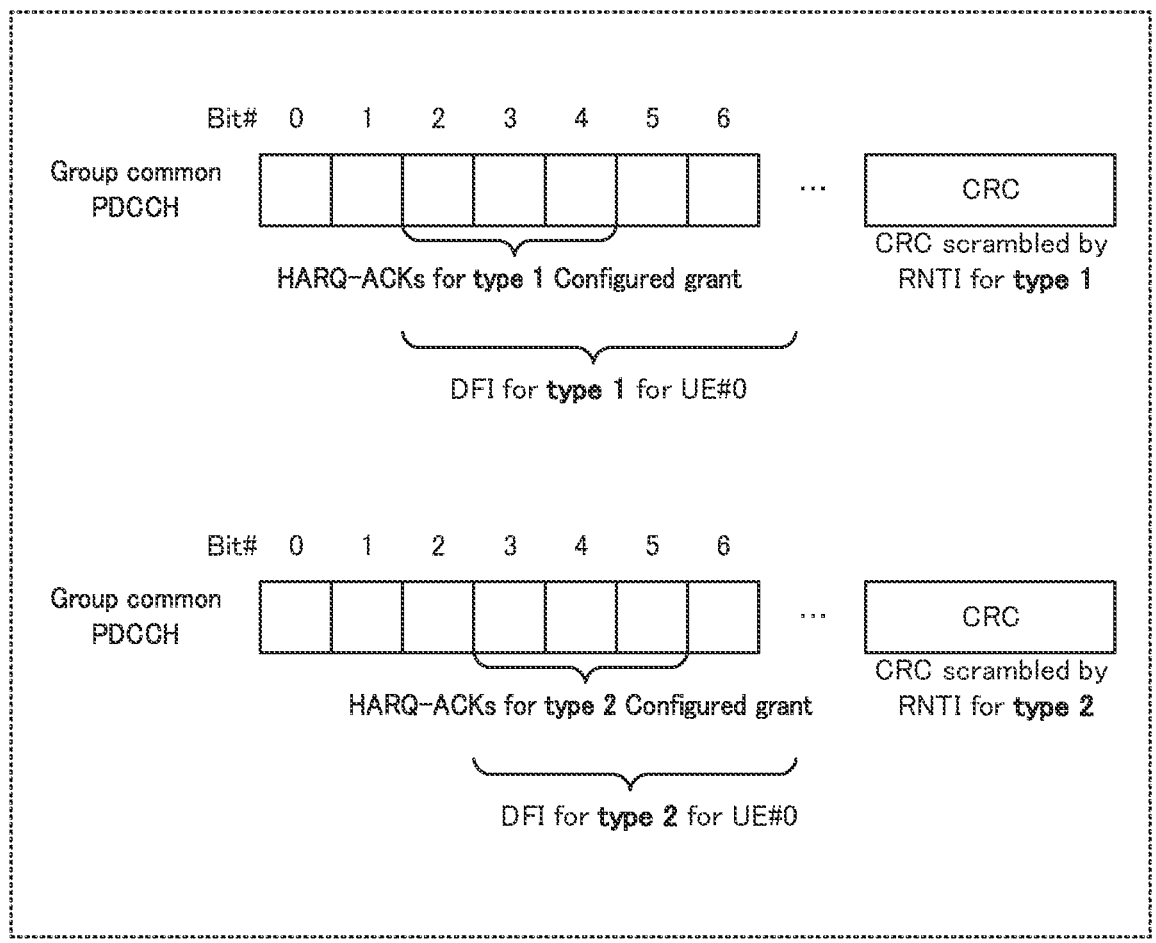
FIG. 9 illustrates an exemplary PDCCH according to division method 1 according to Embodiment 2.

For example, as illustrated in FIG. 9, base station 100 allocates the DFIs corresponding respectively to Configured grant type 1 and Configured grant type 2 to PDCCHs different between the Configured grant types. For example, in FIG. 9, for Configured grant type 1, base station 100 transmits a PDCCH including Cyclic Redundancy Check (CRC) scrambled with an RNTI for Configured grant type 1. Further, in FIG. 9, for Configured grant type 2, base station 100 transmits a PDCCH including CRC scrambled with an RNTI for Configured grant type 2.

In other words, base station 100 transmits the DFI (feedback information) using a different PDCCH (in other words, control information) for each Configured grant configuration (e.g., Configured grant type). Further, each of the PDCCHs is scrambled with a different identifier (here, RNTI) for each Configured grant configuration.

In the example illustrated in FIG. 9, for example, when Configured grant type 2 is not Activated, terminal 200 may not receive the PDCCH using the RNTI for Configured grant type 2. Thus, when Configured grant type 2 is not Activated and when no other bits of the PDCCH for Configured grant type 2 are being used for other terminals 200, base station 100 is capable of stopping transmission of the PDCCH for Configured grant type 2. Further, even when other bits of the PDCCH for Configured grant type 2 are used for other terminals 200, base station 100 may use free bits (3 bits in FIG. 9) which are not used for Configured grant type 2, for allocation of information addressed to other terminals 200. With this configuration, it is possible to improve the use efficiency of PDCCH resources.

Note that the above example has been described by taking the GC-PDCCH as an example. By using the GC-PDCCH, base station 100 is capable of collectively transmitting the DFI for a plurality of terminals 200, for example. However, the PDCCH for the DFI transmission is not limited to the GC-PDCCH, and a UE specific PDCCH may be used. The UE specific PDCCH also offers the same effects as the GC-PDCCH. Further, in the case of the UE specific PDCCH, resources (e.g., PDCCH bits) to which the DFI for each terminal 200 is allocated are not shared with other terminals 200. Thus, for example, base station 100 is capable of stopping PDCCH transmission when Configured grant type 2 is not Activated.

Further, the present disclosure is not limited to the case where Configured grant type 1 and Configured grant type 2 are mixed. For example, also when Configured grant type 1 is not configured and Configured grant type 2 is configured (e.g., multiple Configured grant types 2 are configured by the higher layer signaling), base station 100 may assign a different RNTI for each Configured grant configuration. Thus, base station 100 transmits the PDCCH corresponding to Activated Configured grant type 2 and stops the PDCCH transmission corresponding to non-Activated Configured grant type 2. In addition, terminal 200 is capable of receiving the PDCCH corresponding to an Activated Configured grant among the Configured grants configured.

Further, the present disclosure is not limited to the case where one RNTI is associated with one Configured grant configuration. For example, one RNTI may be associated with a plurality of Configured grant configurations. By associating a plurality of Configured grant configurations with one RNTI, it is possible to reduce the number of RNTIs to be used, so as to reduce erroneous detection (False alarm rate (FAR)) of PDCCH. Further, when a HARQ process is shared among a plurality of Configured grant configurations, base station 100 does not need to redundantly transmit HARQ-ACKs corresponding to the respective Configured grant configurations, and it is thus possible to improve the use efficiency of PDCCH resources. Further, base station 100 does not need to redundantly transmit control information (e.g., TPC command) that is not associated with the Configured grant configurations, and it is thus possible to improve the use efficiency of PDCCH resources.

As is understood, in division method 1, base station 100 divides the DFI using different RNTIs according to the Configured grant type and Configured grant configuration.

Division Method 2

In division method 2, base station 100 provides an identification bit (in other words, identifier field) for DFI, and associates the identification bit with a different value depending on the Configured grant type and Configured grant configuration to divide different DFIs.

When determining the Configured grant configuration, base station 100 configures an identification bit and a DFI-bit allocation starting position in a PDCCH that are different for each Configured grant configuration.

Figure 10:
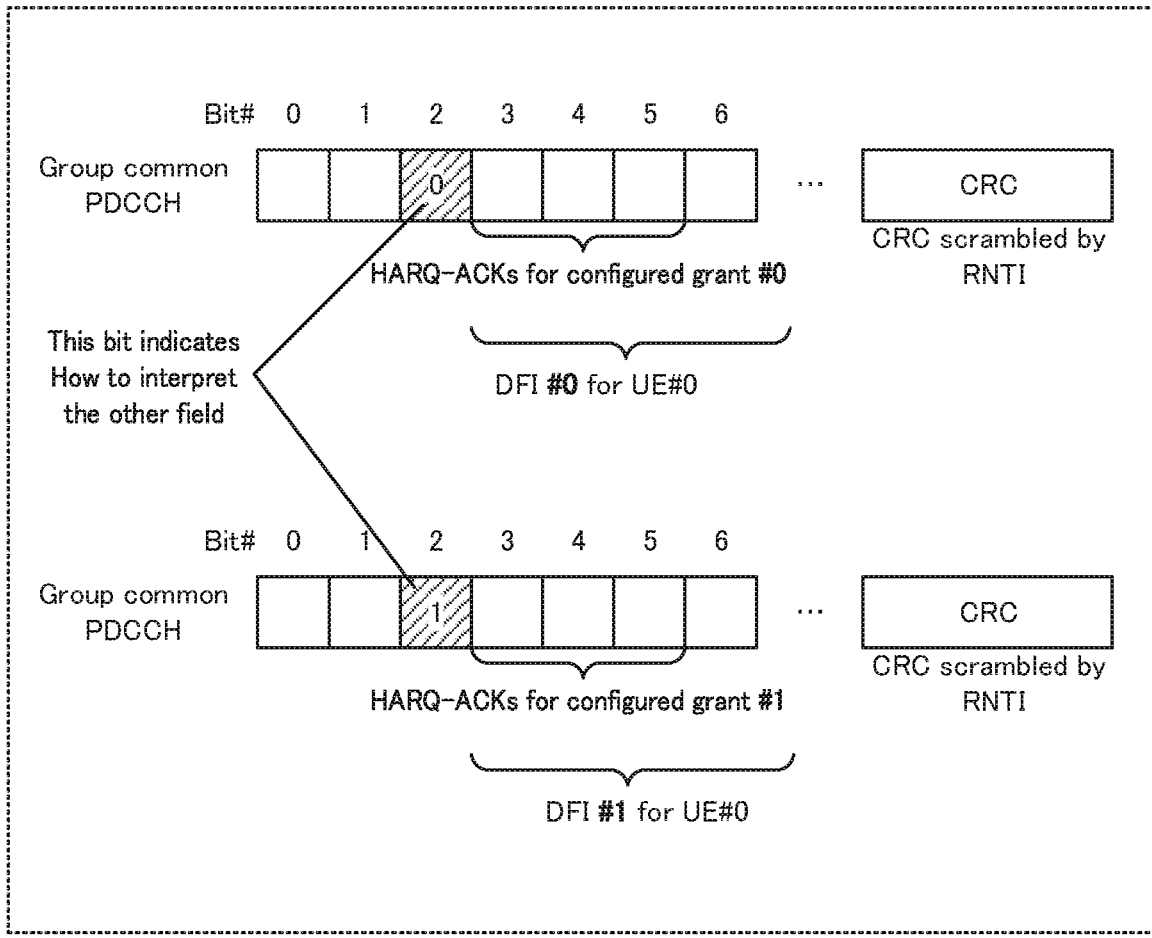
FIG. 10 illustrates an exemplary PDCCH according to division method 2 according to Embodiment 2.

For example, base station 100 allocates the DFI to a PDCCH different for each Configured grant configuration. For example, in the example illustrated in FIG. 10, base station 100 allocates the DFIs corresponding to Configured grant #0 and Configured grant #1 to different PDCCHs. Each of the PDCCHs illustrated in FIG. 10 are provided with the identification bits (Bit #2). In the example illustrated in FIG. 10, the identification bit=0 is associated with Configured grant #0, and the identification bit=1 is associated with Configured grant #1.

In other words, base station 100 transmits the DFI (feedback information) using a different PDCCH (in other words, control information) for each Configured grant configuration (e.g., Configured grant type). Further, each of the PDCCHs includes information (here, identification bit) indicating the Configured grant configuration.

For example, when terminal 200 accepts a plurality of receptions of PDCCHs of the same RNTI, terminal 200 is capable of simultaneously receiving the DFI allocated to these different PDCCHs.

Further, in the example illustrated in FIG. 10, for example, when Configured grant #0 is not Activated, terminal 200 does not have to receive the PDCCH corresponding to Configured grant #0 (in other words, PDCCH including the DFI with the identification bit having a value of 0). Thus, base station 100 may stop transmission of the PDCCH corresponding to Configured grant #0 as in division method 1. Alternatively, base station 100 may use free bits (3 bits in FIG. 10) which are not used for Configured grant #0, for allocation of information addressed to other terminals 200. With this configuration, it is possible to improve the use efficiency of PDCCH resources.

In addition, as in division method 1, the PDCCH for the DFI transmission is not limited to the GC-PDCCH, and a UE specific PDCCH may be used. In addition, as in division method 1, Configured grant type 1 and Configured grant type 2 may be mixed, or Configured grant #1 may not be configured while a plurality of Configured grant types 2 may be configured.

Further, the present disclosure is not limited to the case where one DFI (in other words, identification bit) is associated with one Configured grant configuration. For example, one DFI may be associated with a plurality of Configured grant configurations. By associating one DFI with a plurality of Configured grant configurations, it is possible to reduce the overhead of identification bits. Further, when a HARQ process is shared among a plurality of Configured grant configurations, base station 100 does not need to redundantly transmit HARQ-ACKs corresponding to the respective Configured grant configurations, and it is thus possible to improve the use efficiency of PDCCH resources. Further, base station 100 does not need to redundantly transmit control information (e.g., TPC command) that is not associated with the Configured grant configurations, and it is thus possible to improve the use efficiency of PDCCH resources.

Figure 11:
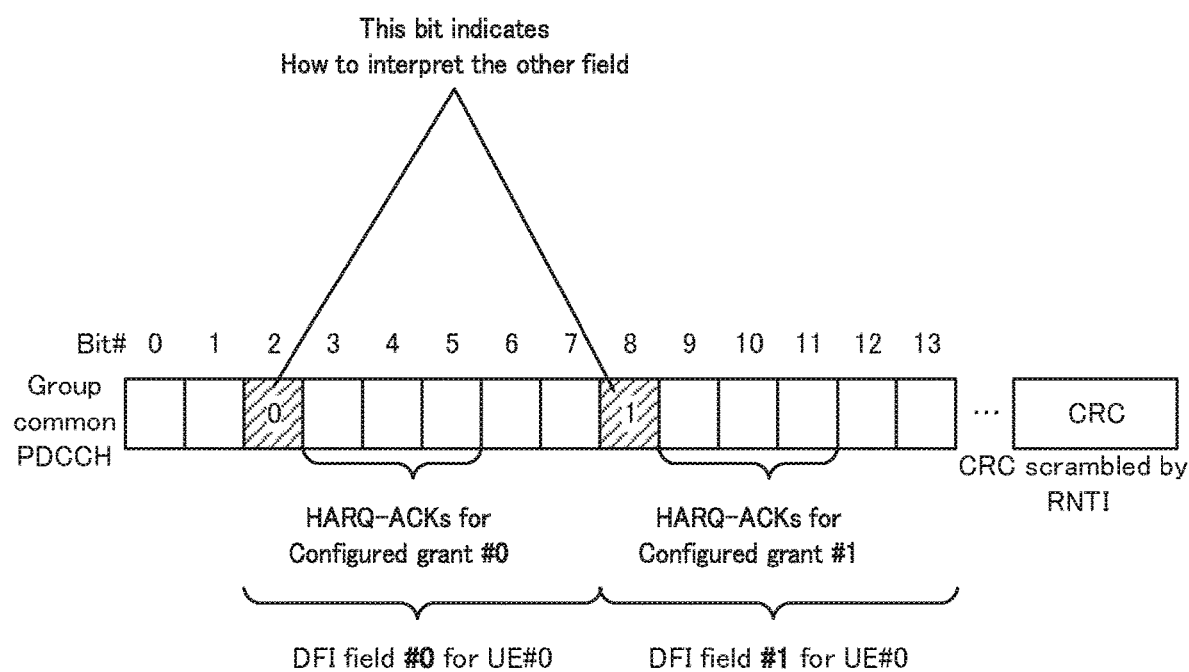
FIG. 11 illustrates an exemplary PDCCH according to division method 2 according to Embodiment 2.

Further, in division method 2, base station 100 may allocate the DFIs corresponding to a plurality of Configured grant configurations to one PDCCH, for example, as illustrated in FIG. 11. In this case, base station 100 does not have to transmit a plurality of PDCCHs when simultaneously transmitting a plurality of DFIs to terminal 200, and it is thus possible to reduce resources used for the PDCCHs. In addition, base station 100 can use bits, for example, for allocation of information addressed to other terminals 200 at bit positions corresponding to a non-Activated Configured grant, and it is thus possible to improve the use efficiency of PDCCH resources.

As described above, in division method 2, base station 100 provides the identification bit for DFI and associates the identification bit with a different value depending on the Configured grant type and Configured grant configuration to divide the DFI.

Here, when the number of RNTIs monitored by terminal 200 increases, the probability of erroneous detection of PDCCH increases due to an accidental CRC result of OK. On the other hand, in division method 2, the number of RNTIs monitored by terminal 200 does not increase with the number of Configured grants, and it is thus advantageous that the erroneous detection rate (False alarm rate (FAR)) of PDCCH does not increase. In other words, division method 2 can reduce the FAR of PDCCH as compared with division method 1.

Division method 1 and division method 2 for DFI have been described above.

As described above, in division method 1 and division method 2, for example, when transmitting HARQ-ACK information, base station 100 allocates a DFI bit to a PDCCH corresponding to a corresponding Configured grant configuration. On the other hand, when not transmitting HARQ-ACK information (for example, when Configured grant type 2 is not Activated), base station 100 does not transmit a PDCCH corresponding to a corresponding Configured grant configuration. With this configuration, it is possible to improve the use efficiency of PDCCH resources. In other words, it is possible to reduce resources which are unnecessarily secured without being used for HARQ-ACK information.

Dynamic Change of DFI Bit Allocation

For example, base station 100 configures DFI-bit allocation of each terminal 200 semi-statically. For example, base station 100 semi-statically configures allocation starting positions of respective DFIs of terminals 200 and RNTIs (when necessary) using the higher layer signaling.

Further, for example, base station 100 may dynamically configure the DFI-bit allocation for each terminal 200. For example, base station 100 configures terminal 200 with a plurality of candidates for the DFI allocation starting position and RNTI (when necessary) using the higher layer signaling. Using a PDCCH for Activation/Release of a Configured grant, base station 100 notifies terminal 200 of information (e.g., an index value) indicating one of the plurality of candidates configured for terminal 200. This allows dynamic allocation of DFI bits while reducing the number of bits used in the PDCCH.

FIG. 12 illustrates exemplary DFI-bit allocation.

In FIG. 12, for example, the DFI allocation starting positions (staring positions in a PDCCH) and the RNTIs are associated respectively with the index values (0 to 3). Information on these associations is notified from base station 100 to terminal 200, for example, using higher layer signaling. By using the PDCCH, base station 100 notifies terminal 200 of an index value corresponding to an allocation starting position and an RNTI (when necessary) actually used for DFI-bit allocation. Terminal 200 identifies the DFI-bit allocation starting position and RNTI based on the index value notified from base station 100.

For example, in the example of FIG. 12, a 2-bit field may be provided in the PDCCH for the DFI-bit allocation.

FIG. 13 illustrates another exemplary DFI-bit allocation.

In FIG. 13, for example, both of DFI-bit allocation starting positions and RNTIs are associated respectively with separate index values. In FIG. 13, base station 100 is capable of separately control the allocation starting position and the RNTI, and is thus capable of allocating the DFI bit more flexibly.

For example, in the example of FIG. 13, a 3-bit field (2 bits for the allocation starting position and 1 bit for RNTI) may be provided in the PDCCH for DFI-bit allocation.

Note that, when there are enough PDCCH bits, base station 100 may directly notify terminal 200 of the DFI-bit allocation starting position (or RNTI) using the PDCCH without configuring DFI-bit allocation candidates by the higher layer signaling.

In addition, the notification of the allocation starting position does not have to be in units of a bit. For example, the allocation starting position may be notified in units of a group of a specific number of bits formed by dividing a plurality of bits (may e.g., notified by a group number).

Further, in Configured grant type 2, whether or not terminal 200 needs DFI is dynamically changed depending on Activation and Release. In this respect, as described above, by dynamically allocating DFI bits, base station 100 is capable of dynamically allocating DFI to free resources, thereby improving the use efficiency of PDCCH resources.

Note that, the dynamic allocation of DFI bits described above is not limited to the DFI, and the dynamic allocation may be applied to other GC-PDCCHs with bit allocation specific to a terminal or to a terminal group. The other GC-PDCCHs may for example, include a TPC command (notified by DCI format 2_2 or 2_3), a Slot Format Indicator (SFI) (notified by DCI format 2_0), and the like. Also in this case, as with the DFI-bit allocation, base station 100 notifies terminal 200 of candidates for the allocation starting position by the higher layer signaling, and notifies a candidate index for use in implementation using a PDCCH.

Further, in this case, regarding PDCCHs, a PDCCH for dynamic configuration that differs from the PDCCH for Activation or Release of the Configured grant may be separately defined in order to enable the dynamic configuration independent of the Configured grant. In the PDCCH for dynamic configuration as in the PDCCH for Activation/Release of the Configured grant, a particular field is configured with a value of a particular pattern. At this time, in the PDCCH for dynamic configuration, for example, a value of a pattern different from that of the PDCCH for Activation/Release of the Configured grant, or a RNTI to be used is used. Thus, terminal 200 is capable of distinguishing the PDCCH for the dynamic configuration. Note that, when there are enough PDCCH bits, base station 100 may directly notify terminal 200 of the allocation starting position using the PDCCH without configuring the candidates by the higher layer signaling. Thus, by dynamically configuring the allocation starting position in the GC-PDCCH with the bit allocation specific to a terminal or to a terminal group, base station 100 is capable of dynamically allocating the GC-PDCCH to free resources, thereby improving the use efficiency of PDCCH resources.

Note that, target information for dynamic allocation is not limited to the above-described TPC command and SFI, and may be other information (e.g., UE-specific configuration information or the like).

Embodiment 3

The present embodiment will be described in relation to an operation in which Configured grant type 2 is not Activated as in Embodiment 2.

Since the base station and the terminal according to the present embodiment have the same basic configurations as base station 100 and terminal 200 according to Embodiment 1, they will be described with reference to FIGS. 3 and 4.

DFI Substitution Method

An exemplary DFI substitution method for base station 100 (e.g., DFI generator 106) will be described. Note that, terminal 200 (e.g., DFI analyzer 206) also performs DFI analysis based on a DFI substitution method similar to that of base station 100.

Base station 100 substitutes bits assigned for the DFI for Configured grant type 2 with other control information, for example, when Configured grant type 2 is not Activated.

For example, base station 100 may substitute the DFI with precoding information, TPC command, or the like of another Configured grant. This allows base station 100 to transmit feedback information so that a transmission method according to the current communication state or propagation path is configured for terminal 200, so as to improve the reception quality of base station 100.

Alternatively, base station 100 may substitute the DFI with a SRS request, a CSI request, or the like. This allows base station 100 to trigger terminal 200 to transmit a signal or information for grasping the current communication state.

As described above, according to the present embodiment, base station 100 transmits other control information by utilizing the bits allocated for the DFI that are not used in the non-Activated case. It is thus possible to achieve improvement in the reception quality of base station 100 without an increase in the number of bits of the PDCCH, so as to improve the use efficiency of PDCCH resources.

Note that, the information substituting the DFI is not limited to the precoding information, TPC command, SRS request, and CSI request, and may be other information.

Exemplary embodiments of the present disclosure have been described above.

Other Embodiment

Note that, the number of CBGs may be configured by the higher layer signaling (e.g., RRC signaling or MAC signaling) or may be pre-configured according to specifications.

The above embodiments may be applied to a case where base station 100 collectively transmits HARQ-ACKs of a plurality of Component Carriers (CCs) to terminal 200 at the time of Carrier Aggregation (CA), for example. When HARQ-ACKs of the plurality of CCs are transmitted collectively, more PDCCH resources are required, and accordingly, application of the present embodiments can improve the use efficiency of PDCCH resources.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/ telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an exemplary embodiment of the present disclosure includes: control circuitry, which, in operation, determines a transmission method for transmitting feedback information including a response signal for uplink data, based on a configuration of resource allocation configured for a terminal; and transmission circuitry, which, in operation, transmits the feedback information based on the transmission method.

In the base station according to an exemplary embodiment of the present disclosure, the configuration includes a type of the resource allocation, and the control circuitry determines, based on the type, a number of bits used for transmission of the response signal.

In the base station according to an exemplary embodiment of the present disclosure, the control circuitry determines the number of bits based on a transport block size of the uplink data when the type is a first type, and determines the number of bits based on a maximum number of code block groups constituting the transport block when the type is a second type different from the first type.

In the base station according to an embodiment of the present disclosure, the transmission circuitry transmits the feedback information using control information different for each of a plurality of the configurations.

In the base station according to an exemplary embodiment of the present disclosure, the control information is scrambled with an identifier different for each of the configurations.

In the base station according to an exemplary embodiment of the present disclosure, the control information includes information indicating the configuration.

A terminal according to an exemplary embodiment of the present disclosure includes: reception circuitry, which, in operation, receives feedback information from a base station, the feedback information including a response signal for uplink data; and control circuitry, which, in operation, analyzes the feedback information based on a configuration of a resource allocation configured.

A communication method according to an exemplary embodiment of the present disclosure includes: determining a transmission method for transmitting feedback information including a response signal for uplink data, based on a configuration of resource allocation configured for a terminal; and transmitting the feedback information based on the transmission method.

A communication method according to an exemplary embodiment of the present disclosure includes: receiving feedback information from a base station, the feedback information including a response signal for uplink data; and analyzing the feedback information based on a configuration of a resource allocation configured.

The disclosure of Japanese Patent Application No. 2019-001857 dated Jan. 9, 2019 including the specification, drawings and abstract is incorporated herein by reference in its entirety.

REFERENCE SIGNS LIST

100 Base station
101, 201 Receiver
102, 202 Demodulator/decoder
103 Scheduler
104, 208 Transmission controller
105, 207 Control information holder
106 DFI generator
107 Signaling information generator
108 Activation information generator
109, 210 Encoder/modulator
110, 211 Transmitter
200 Terminal
203 Extractor
204 Signaling information analyzer
205 Activation information analyzer
206 DFI analyzer
209 Transmission data generator

INDUSTRIAL APPLICABILITY

An exemplary embodiment of the present disclosure is useful for mobile communication systems.

The invention claimed is:

1. An integrated circuit, comprising:
reception circuitry, which, in operation, controls receiving feedback information from a base station on a user equipment (UE) specific physical downlink control channel (PDCCH), the feedback information including a response signal for uplink data; and
transmission circuitry, which, in operation, controls a retransmission based on the feedback information and information of a configured grant transmission,
wherein the feedback information indicates hybrid automatic repeat request acknowledgement (HARQ-ACK) information for each hybrid automatic repeat request (HARQ) process by using a bitmap.

2. The integrated circuit according to claim 1, wherein the feedback information includes a first HARQ-ACK information of a first configured grant transmission and a second HARQ-ACK information of a second configured grant transmission,
the first configured grant transmission is configured by a higher layer signaling, and
the second configured grant transmission is configured by activation downlink control information (DCI) after a reception of the higher layer signaling.

3. The integrated circuit according to claim 2, wherein the UE specific PDCCH is scrambled with a Radio Network Temporary Identifier (RNTI) corresponding to both of the first configured grant transmission and the second configured grant transmission.

4. The integrated circuit according to claim 2, wherein the UE specific PDCCH includes an identification bit associated with the first configured grant transmission and the second configured grant transmission.

5. The integrated circuit according to claim 1, wherein each bit of the bitmap indicates acknowledgement (ACK) or negative acknowledgement (NACK) for a respective HARQ process.

6. The integrated circuit according to claim 1, wherein assignment information of the feedback information is indicated by the UE specific PDCCH.

7. A communication method comprising:
receiving feedback information from a base station on a user equipment (UE) specific physical downlink control channel (PDCCH), the feedback information including a response signal for uplink data; and
controlling a retransmission based on the feedback information,
wherein the feedback information indicates hybrid automatic repeat request acknowledgement (HARQ-ACK) information for each hybrid automatic repeat request (HARQ) process by using a bitmap,
wherein the feedback information includes a first HARQ-ACK information of a first configured grant transmission and a second HARQ-ACK information of a second configured grant transmission,
the first configured grant transmission is configured by a higher layer signaling, and
the second configured grant transmission is configured by activation downlink control information (DCI) after a reception of the higher layer signaling.

8. A communication apparatus comprising:
a receiver, which in operation, receives feedback information from a base station on a user equipment (UE) specific physical downlink control channel (PDCCH), the feedback information including a response signal for uplink data; and
circuitry, which in operation, controls a retransmission based on the feedback information,
wherein the feedback information indicates hybrid automatic repeat request acknowledgement (HARQ-ACK) information for each hybrid automatic repeat request (HARQ) process by using a bitmap,
wherein the feedback information includes a first HARQ-ACK information of a first configured grant transmission and a second HARQ-ACK information of a second configured grant transmission,
the first configured grant transmission is configured by a higher layer signaling, and
the second configured grant transmission is configured by activation downlink control information (DCI) after a reception of the higher layer signaling.

* * * * *